United States Patent [19]

Takahashi

[11] 4,237,750

[45] Dec. 9, 1980

[54] PLANETARY GEAR REDUCTION SYSTEM

[76] Inventor: Takashi Takahashi, 26-18, Kamisoshigaya 1, Setagaya-ku, Tokyo, Japan

[21] Appl. No.: 904,483

[22] Filed: May 10, 1978

[51] Int. Cl.³ .................. F16H 1/28; F16H 57/00; F16H 57/04

[52] U.S. Cl. .................. 74/801; 74/410; 74/467

[58] Field of Search .......... 74/467, 410, 801

[56] References Cited

U.S. PATENT DOCUMENTS

| | | | |
|---|---|---|---|
| 1,281,785 | 10/1918 | Kellow | 74/801 |
| 1,386,960 | 9/1921 | Sharp | 74/467 X |
| 2,218,838 | 10/1940 | Alspaugh | 74/801 X |
| 2,357,561 | 9/1944 | Tatlow | 74/801 |
| 2,369,422 | 2/1945 | Williams | 74/801 |
| 2,547,877 | 4/1951 | Lucia | 74/410 X |
| 3,364,771 | 1/1968 | Takahashi | 74/467 X |
| 3,454,136 | 7/1969 | Stark | 74/467 X |
| 3,777,588 | 12/1973 | Takahashi et al. | 74/467 X |

OTHER PUBLICATIONS

"Boundary Layer Theory", H. Schlichting, 6th edition, 1968, pp. 108-114.

*Primary Examiner*—Leslie Braun
*Attorney, Agent, or Firm*—Armstrong, Nikaido, Marmelstein & Kubovcik

[57] ABSTRACT

A planetary gear reduction system, compact in size, high in the ratio of speed reduction and improved in durability as well as easiness for assemblage and adjustment, which essentially comprises planet gear mechanisms disposed in multiple stages and in series within a casing, in which the planet gears individually include a built-in floating intermediate ring member which distributes the load imposed uniformly among the planet gears.

2 Claims, 5 Drawing Figures

FIG.4
FIG.5
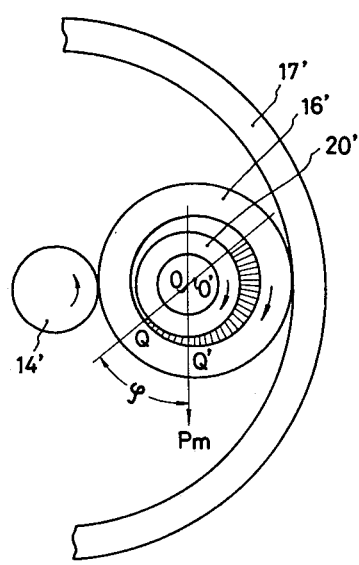
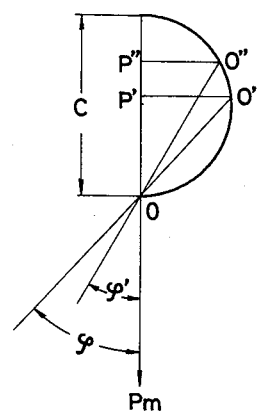

PLANETARY GEAR REDUCTION SYSTEM

BACKGROUND OF THE INVENTION (1) Field of the Invention

The present invention relates to a speed reduction system having a high reduction ratio. More particularly, the invention concerns a speed reduction system which utilizes a planet gear mechanism and can attain the speed reduction at a higher ratio for its size which is relatively small, and which has a high durability.

(2) Brief Description of the Prior Art

Planet gear mechanism are generally characterized in that they can be relatively small in size and yet can provide a speed reduction at relatively high ratios. However, with such mechanisms, errors in processing, if any, would become synergistically manifested during the operation, so that an extremely high precision is required to answer in the production or assembling of the mechanism: If there are errors with respect to gears or in the indexing of planet shafts, the load imposed cannot be uniformly distributed on respective planet gears and it often happens that the inter-gear meshing or engagement is excessively strong with some gears and very weak with the other, permitting to readily occur abnormal vibration, abrasion and wearing, and also a great power loss. Similarly, with the conventional speed reduction systems it has been highly likely that gears or shafts undergo irregular rotation, if slightly, whereby the durability of the system is drastically lowered.

In addition to the foregoing difficulties, conventional speed reduction systems present another problem such that since processing should be performed at a high precision in order to prevent the above-mentioned irregular engagement among the members of planet gear mechanisms, the manufacturing cost is inevitably increased. Further, the life of such conventional system is extremely short, and various difficulties are encountered when it is used under a high load condition.

A system in which a plurality of planet gear mechanisms are arranged in series so as to obtain a high reduction ratio has already been proposed. However, the structure of such conventional system is complicated and it is very difficult to assemble or disassemble this conventional system. Moreover, the system cannot be manufactured at a relatively low cost. (3) Objects of the Invention:

The present invention has been made as a result of investigations made with a view to developing a speed reduction system in which the foregoing defects involved in the conventional techniques can be eliminated.

It is therefore a primary object of the present invention to provide a speed reduction system in which the engagement between a sun gear and a planet gear is very smooth and occurrence of irregular engagements can be completely prevented, and which has a high durability and can attain a very high reduction ratio at a high transmission efficiency.

Another object of the present invention is to provide a speed reduction system which as a simple structure with a high durability and yet can be manufactured at a low cost.

Still another object of the present invention is to provide a multi-stage planetary gear speed reduction system which can be assembled or disassembled very easily and simply.

BRIEF SUMMARY OF THE INVENTION

In the present invention, it is proposed to have the spring action of an oil film enhanced in order to eliminate non-uniform distribution of the load on planet gears owing to processing errors, and a first characteristic feature of the present invention resides in that as means for enhancing the spring action of oil film, a structure herein named "floating intermediate ring" is installed in each planet gear.

More specifically, a floating intermediate ring is fitted to a planet shaft through a roller bearing, and planet gears are held in a spaced arrangement about the outer periphery of this floating ring member.

A second characteristic feature of the present invention consists in that a carrier holding the planet gear is not supported by a bearing but is completely floated and that the sun gear fixed to the carrier is formed in a hollow structure to thereby reduce the weight thereof and facilitate the displacement required for coping with an error in the processing.

A third characteristic feature of the present invention comprises that in order to facilitate manufacture and assemblage of respective members, the sun gear is connected to the carrier for driving the former through spline fitting and rotation of internal spur gears is inhibited by one key; in addition, the internal spur gears are supported by a very simple structure.

BRIEF DESCRIPTION OF THE DRAWINGS

The accompanying drawings illustrate preferred embodiments of the present invention, in which:

FIGS. 4 and 5 are diagrams illustrating the principle according to which the spring action is applied to a planet gear by an oil film.

DETAILED DESCRIPTION OF THE PREFERRED EMBODIMENTS

Figure 1:
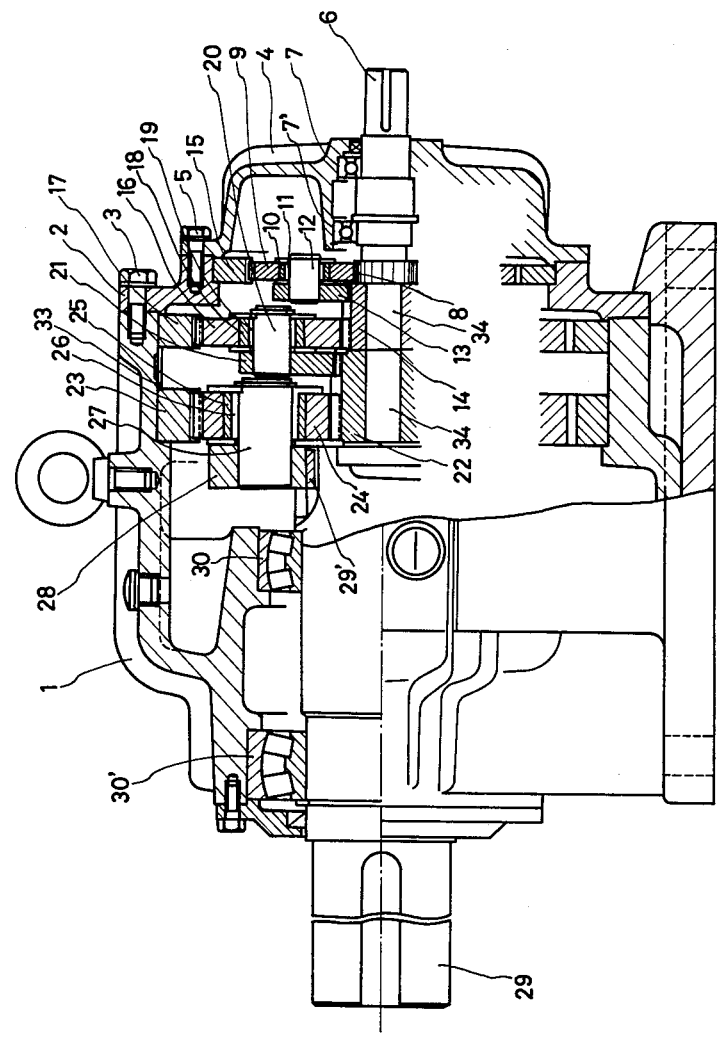
FIG. 1 is a partially cut-out sectional view showing a speed reduction system in which three stages of planet gear mechanisms are built.

The planetary gear reduction system of the present invention has a multi-stage structure as shown in FIG. 1, in which a first cover 2 is fixed to a casing 1 by a bolt 3, and a second cover 4 is fixed to the first cover 2 through a bolt 5.

The structure of the planetary gear reduction system of the present invention will now be described according to the order or sequence of the transmission of power.

An input shaft 6 is rotatably supported in a hole formed in a central portion of the second cover 4 by means of bearings 7 and 7', and a sun gear 8 is mounted at the top or inward end of the shaft 6. A plurality of planet gears 9 are engaged with the periphery of the sun gear 8, and each planet gear 9 is supported on a planet shaft 12 through a floating intermediate ring 10 and a needle bearing 11. The planet shaft 12 is fixed to a carrier 13, and a second sun gear 14 is fixed to the center of the carrier 13. An internal spur gear 15 is disposed in the interior of the first cover 2, and this gear 15 is engaged with the planet gears 9.

Engageable with the second sun gear 14 are planet gears 16, which revolve within an internal spur gear 17. A floating intermediate ring member 18, a needle bearing 19, a planet shaft 20 and a carrier 21 are assembled in the same manner as in the above-mentioned planet gear mechanism of the first stage.

A third sun gear 22 is fixed to the central portion of the carrier 21 to drive planet gears 24 engageable with an internal spur gear 23. Reference numerals 25, 26, 27 and 28 represent a floating ring member, a needle bearing, a planet shaft and a carrier, respectively. The carrier 28 is fixed to an output shaft 29 through spline 29', and the shaft 29 is supported by bearings 30 and 30' fixed to the casing.

Figure 2:
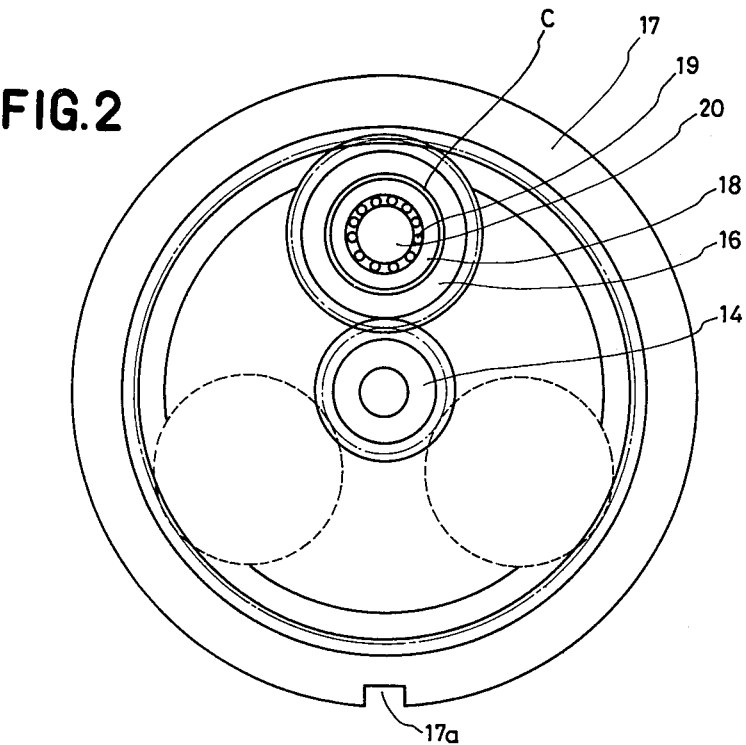
FIG. 2 is a front view showing a planet gear mechanism.
Figure 3:
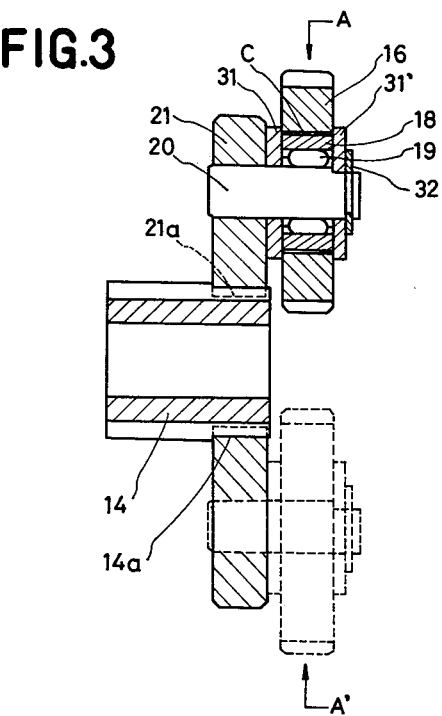
FIG. 3 is a sectional side view showing a structure including a sun gear, carriers and planet gears attached thereto.

FIG. 2 if a front view illustrating the planet gear mechanism of the second stage, and FIG. 3 is a sectional side view showing the gear mechanism of FIG. 2 with the internal spur gears removed away.

The end portion 14a of the second sun gear 14 is stepped, and a spline 21a formed on the carrier 21 is press fitted to the stepped end portion 14a of the second sun gear 14. If the carrier 21 and the sun gear 14 are formed separately and independently from each other as in the present embodiment, manufacture of these members can be remarkably facilitated, and when these members are integrated with each other by utilizing spline fitting, the integration can be complete and shaking which otherwise is likely during the operation can be substantially checked.

Fixation of the planet shaft 20 to the carrier 21 can be accomplished according to various methods. For example, an annular groove may be formed in the hole of the carrier, and after the planet shaft 20 is inserted into this hole, a notch may be formed in the terminal portion of the planet shaft 20 by a chisel or the like and such terminal portion of the shaft may be bulged in the annular groove to effect fixation. Further, there may be adopted a method in which contrary to the above mentioned method an annular groove is formed in the circumferential direction of the planet shaft and a part of the wall of the hole of the carrier is bulged into the annular groove to effect fixation.

As shown in FIG. 3, there are side plates 31 and 31' formed about the sides of the needle bearing 19, floating ring member 18 and planet gear 16, and another side planet 32 is disposed on the outside of the side plate 31', whereby each of the above-mentioned members are prevented from falling down out of the planet shaft 20. In this case, it is preferred that a part of the planet shaft 20 be notched to prevent the side plates 31' and 32 from rolling or rotating.

Three planet gears 9, 16 and 24 supported on the corresponding shafts mounted on the corresponding carriers revolve, in a set, around the sun gears 8, 14 and 22 engaged therewith. Each planet gear is floatingly supported on the corresponding carrier, and this feature of the structure will be described in detail hereinafter.

As shown in FIG. 1, a cylindrical portion is cut out from the interior of the casing 1, and internal spur gears 17 and 23 are fitted in the cylindrical hollow portion and fixed to the casing 1 by utilizing one key member. As shown in FIG. 2, a key groove 17a is formed on the peripheral face of the internal spur gear 17, and a similar groove is also formed in the confronting portion of the casing 1 though not specifically illustrated in the drawings. The key is applied through those key grooves to fix the internal spur gears and prevent them from rotating.

When there are a plurality of internal spur gears disposed, it is preferred that a spacer 33 be provided between every two adjacent internal spur gears to determine their relative positions with respect to the lateral direction. In some cases it may be preferred to have no key groove formed on the side of the casing 1, and then the internal spur gears may be fixed to the casing by utilizing stop screws or the like.

In the present invention, it forms an important feature that the carriers holding the planet gears thereon are floatingly supported, and in order to attain this feature, it is necessary that the weights of the sun gears and carriers should be reduced to facilitate the floating movement thereof. Therefore, each of the sun gears 14 and 22 is formed in the central portion thereof with a hollow hole 34 to reduce the thickness. In addition to the effect of reducing the weight, this hollow hole 34 exerts an effect of containing the holding therein a lubricating oil.

In the present invention, the carriers 13 and 21 are rotatable in the state not supported by any bearing, and it forms another important feature of the present invention that the planet gears are floatingly supported on planet shafts fixed to such carriers.

It also is important with the present invention that the planet gears are supported on planet shafts through floating intermediate rings. The floating ring member generates spring action of an oil film between itself and the planet gear, and makes uniform imposition of load on the plurality of planet gears. This floating structure and its function will now be described in greater detail.

Referring to FIGS. 2 and 3, the floating ring 18 is supported on the planet shaft 20 through a roller bearing, and outer to the ring member 18 there is the planet gear 16 disposed with a suitable clearance C for generating an oil film provided between the member 18 and the gear 16. The intermediate ring 18 and the gear 16 are so arranged as to turn or rotate together.

FIGS. 4 and 5 are diagrams taken for a theoretical explanation of the principle of the above-mentioned spring action and the relation among the floating intermediate ring 20', planet gear 16' and sun gear 14'. Herein, the theory of the plane bearing of the case where both shaft and bearing turn or rotate together will be applied.

Symbols in FIGS. 4 and 5 have the following meanings:

Pm: Bearing load per unit area
Q: Point of minimum thickness of oil film
Q': Load point
$\phi, \phi'$: Eccentric angle
O: Center of floating intermediate ring
O': Center of the planet gear Supposing that the bearing load Pm increases, then the eccentric angle $\phi$ becomes reduced to $\phi'$ and Q becomes closer to Q', in accordance with the berating theory. In this case, the center O' shifts from the point 0' to the point O" while drawing a locus resembling a semicircle having the radius clearance C as the diameter as shown in FIG. 5. Namely, as the load increases, the center O' of the planet gear 16' moves toward the direction of load by a distance $\overline{P'P''}$.

This movement of the planet gear 16' means the spring action, and the compliance $\mathcal{C}$ of this spring action is expressed as follows:

$$\mathcal{C} = \frac{\partial OP'}{\partial Pm}$$

Supposing that the radius of the floating intermediate ring is r, that the eccentricity is n and that the viscosity coefficient of the lubricating oil is $\mu$, $$OP' = Cn \cos \phi \text{ and } \tan \phi = \frac{\pi \sqrt{1-n^2}}{2n} \quad (1)$$

and $$Pm = 12\pi \mu N (\frac{r}{C})^2 \frac{n \sqrt{4n^2 + \pi^2(1-n^2)}}{(2+n^2)(1-n^2)} \quad (2)$$

Therefore, the compliance $\mathcal{C}$ is expressed as follows:

$$\mathcal{C} = \frac{\partial OP'}{\partial n} / \frac{\partial Pm}{\partial n} = \frac{C}{6\pi \mu N} (\frac{C}{r})^2 f(n) \quad (3)$$

wherein f(n) is a function of n.

Thus, in order to obtain a large spring action, it is necessary to obtain a greater value of the compliance $\mathcal{C}$, and it is preferred to make that from the above formula (3) a larger radius clearance C can be obtained within a range in which an oil film is generated. Further, as before stated the relation between the floating intermediate ring and the planet gear corresponds to the plane bearing in the case where both shaft and bearing turn or rotate together, therefore the Sommerfeld value is two times of the value of an ordinary bearing and is expressed as follows:

$$S = \frac{2\mu N}{Pm} (\frac{r}{C})^2.$$

(Oscar Pinks & Beno Sternlicht: "Theory of Hydrodynamic Lubrication"; McGraw Hill, 1961).

More specifically, the Summerfeld value of an ordinary plane bearing void of the floating ring member is expressed:

$$S = \frac{\mu N}{Pm} (\frac{r}{C})^2,$$

and if the eccentricity is the same, the radius clearance $\mathcal{C}$ of the bearing including the ring member should be $\sqrt{2}$ times of the radius clearance of the ordinary bearing. This means an increase in the compliance $\mathcal{C}$ in the above formula (3). The above is the theoretical reason why a larger spring action can be obtained by the oil film when the floating ring member is used.

As shown in FIGS. 2 and 3, the planet gear 16 is supported through the floating ring member 18, a radius clearance C is formed between the ring 18 and the planet gear 16, and an oil film is formed in such clearance. Through such arrangement according to the present invention, the spring action is given the planet gear 16 while it is indirectly supported on the planet gear shaft 20, whereby the load imposed on the respective planet gears can be effectively made uniformly or evenly distributed, and this means a very important action in the planet gear mechanism.

Further, as before stated the planet gear is supported on the planet gear shaft elastically by the oil film through the floating intermediate ring, therefore even if the sun gears except the one of the first stage and carriers integrated therewith are floatingly supported, various errors on the gears can be compensated for and the engagement of engageable members can be maintained very smoothly.

Furthermore, according to the present invention the planet gear mechanism is constructed in principle as shown in FIGS. 2 and 3, and a multiple stage planetary gear reduction system can therefore be assembled very easily by inserting and fitting a plurality of plane gear mechanisms having such structure in succession into the casing. Therefore, the manufacturing and assembling operations can be remarkably facilitated, and also such as an inspection, repairing and adjustment can be performed very easily.

The functions of the multi-stage planetary gear reduction system shown in FIG. 1 will now be described.

From the input shaft 6, an input of a high rotation number is supplied to drive the second sun gear 14 through the first sun gear 8, planet gears 9 and carriers 13.

The power to the second sun gear 14 is transmitted to planet gears 16, carriers 21 and the third sun gear 22 to drive the output shaft 29 through planet gears 24 and carriers 28. As is seen from the foregoing, three stages of the planet gear mechanisms are disposed between the input shaft 6 and the output shaft 29. Accordingly, although the size of the entire system is remarkably diminished, a high speed reduction ratio can be attained according to the present invention.

Particularly, according to the present invention, as illustrated in FIGS. 2 and 3 the planet gear 16 is not directly supported on the shaft 20 but is indirectly supported through the bearing 19 and floating intermediate ring member 18, and an oil film is formed in the clearance C between the ring 18 and gear 16. As theoretically analyzed hereinbefore, this oil film exerts a large spring action. Accordingly, the planet gear 16 is allowed to move independent of the movement of the integrated assembly of the sun gear 14, carriers 21 and shafts 20. Therefore, the planet gear 16 can move smoothly and lightly while correcting or compensating for an engagement error, if any. As a result, the load is imposed in a uniformly distributed manner on respective planet gears, and there can be attained various advantages. For example, the durability of the reduction system can be remarkably improved, the loss of power can be drastically suppressed, and the power transmission efficiency can be high.

Moreover, the sun gear 14, carrier 21 and planet shaft 20 assembled in an integrated arrangement are not supported through a bearing, and the sun gear is reduced in its weight by forming a hollow portion in the interior thereof. Accordingly, the integrated assembly of the above members can move very lightly and smoothly, and an irregular engagement among the gears can be effectively eliminated.

The planetary gear reduction system of the present invention can be assembled by inserting and fitting unitary assemblies individually consisting of a sun gear, carriers, planet gears and an internal spur gear, in succession into the casing as shown in FIGS. 2 and 3. Therefore, such operations as assembling, disassembling, adjustment of relative positions of respective members and replacement of respective members can be performed very easily.

As will be apparent from the foregoing description, the structure of the planetary gear reduction system of the present invention is very simple although it has an excellent capacity of correcting engagement errors, and the present invention can therefore provide a speed reduction system reduced in weight.

What is claimed is:

1. A planetary gear reduction system including at least two planet gear mechanisms assembled in series within a casing, individually comprising a sun gear, a plurality of planet gears engageable with said sun gear, floating intermediate rings supporting said planet gears, roller bearings, planet shafts individually disposed about a central portion of each roller bearing and supported by a carrier, each of said plurality of planet gears having a corresponding internal spur gear which engages its outer periphery; each of the separate internal spur gears being laterally spaced from each other by a spacer member to determine their relative position with respect to the lateral direction; each of said spur gears having a key groove formed on its peripheral face and a corresponding similar groove formed in the confronting portion of the casing with a key positioned in said grooves to fix the internal spur gears to the casing to permit rotation; an input shaft and an output shaft respectively supported through two bearings at one side and the other of said casing, wherein the carriers supporting intermediately disposed planet gears and sun gear are supported in a floating condition without being supported through bearings, said sun gears and carriers are fixed by pressing in of a spline.

2. A planetary gear reduction system as recited in claim 1, wherein the sun gear of an intermediate planet gear mechanism has a hollow structure.

* * * * *